(12) United States Patent
Bebon et al.

(10) Patent No.: US 12,515,525 B2
(45) Date of Patent: Jan. 6, 2026

(54) ELECTRIC AIR COMPRESSOR CONTROL

(71) Applicant: Volvo Truck Corporation, Gothenburg (SE)

(72) Inventors: Hugo Bebon, St Priest (FR); Fabrice Dussapt, Lyons (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 45 days.

(21) Appl. No.: 18/406,366

(22) Filed: Jan. 8, 2024

(65) Prior Publication Data

US 2024/0227563 A1    Jul. 11, 2024

(30) Foreign Application Priority Data

Jan. 11, 2023 (EP) ..................................... 23151050

(51) Int. Cl.
*B60L 1/00* (2006.01)
(52) U.S. Cl.
CPC .................... *B60L 1/003* (2013.01)
(58) Field of Classification Search
CPC ............. B60L 1/003; F04B 2203/0209; F04B 2205/063; F04B 35/04; F04B 49/08; F04B 49/20; F04B 41/02
See application file for complete search history.

(56) References Cited

U.S. PATENT DOCUMENTS

| 8,225,900 B2 * | 7/2012 | Domes ..................... B60K 6/12 |
| | | 180/302 |
| 8,467,950 B1 | 6/2013 | Pfefferl et al. |
| 10,883,482 B2 * | 1/2021 | Nemeth ................. F04B 35/04 |
| 11,549,450 B2 * | 1/2023 | Rollinger ............ F02D 41/0007 |

(Continued)

FOREIGN PATENT DOCUMENTS

| DE | 102008006860 A | 1/2008 |
| EP | 2005226538 A | 8/2005 |

(Continued)

OTHER PUBLICATIONS

Extended European Search Report, European Patent Application No. 23151050.4, mailed Apr. 12, 2023, 9 pages.

*Primary Examiner* — Dapinder Singh
(74) *Attorney, Agent, or Firm* — Sage Patent Group

(57) ABSTRACT

A method for controlling airflow of an electric air compression system of an electric or hybrid vehicle is disclosed. The vehicle includes air consumers connected to an air storage system. The method includes continuously monitoring air consumption data. The air consumption data are defined by an activation status of the air consumers and/or air pressure gradient in the air storage system. The method includes determining an air consumption based on the monitored air consumption data and comparing the determined air consumption with a predetermined air consumption threshold. If the determined air consumption is below the predetermined air consumption threshold, the electric air compression system is controlled to operate at a first airflow value. If the determined air consumption is equal to or above the predetermined air consumption threshold, the electric air compression system is controlled to operate at a second airflow value which is greater than the first airflow value.

13 Claims, 6 Drawing Sheets

(56) References Cited

U.S. PATENT DOCUMENTS

| | | | |
|---|---|---|---|
| 2004/0237517 A1* | 12/2004 | Cho | B60L 50/51 |
| | | | 903/902 |
| 2015/0176575 A1* | 6/2015 | Nemeth | F04B 49/022 |
| | | | 417/34 |
| 2015/0298520 A1* | 10/2015 | Hayes | F04B 49/06 |
| | | | 701/37 |
| 2020/0116145 A1 | 4/2020 | Park et al. | |

FOREIGN PATENT DOCUMENTS

| | | |
|---|---|---|
| EP | 2708429 B1 | 5/2015 |
| EP | 3364035 A1 | 8/2018 |
| EP | 4197828 A1 | 6/2023 |
| JP | 2005214137 A | 8/2005 |
| JP | 2005226538 A | 8/2005 |

\* cited by examiner

ELECTRIC AIR COMPRESSOR CONTROL

CROSS REFERENCE TO RELATED APPLICATIONS

This application claims priority to European Patent Application No. 23151050.4, filed on 11 Jan. 2023, the disclosure and content of which is incorporated by reference herein in its entirety.

TECHNICAL FIELD

The disclosure relates generally to an electric air compressor control. In particular aspects, the disclosure relates to the electric air compressor control on the basis of a vehicle air needs. The disclosure can be applied in heavy-duty vehicles, such as trucks, buses, and construction equipment. In particular, the disclosure can be applied in electrical and hybrid vehicles. Although the disclosure may be described with respect to a particular vehicle, the disclosure is not restricted to any particular vehicle.

BACKGROUND

On electric/hybrid vehicles, an electric air compressor is used to provide compressed air for pneumatic systems. Today, the electric air compressor is controlled at a nominal speed to answer to the average vehicle air consumption. During the vehicle lifetime and depending on applications, the air consumption varies from one hour to another and from one day to another. Some applications, such as an air suspension, have very high air consumptions, e.g., 500-700 stdL/min. The electric air compressor running at nominal speed cannot answer to such high air need. This leads to reduced features, for instance, more time is needed to inflate the air suspension.

An obvious idea would be to control the compressor at its maximum speed to deliver its highest airflow any time the compressor is started. However, high airflow is not always needed and operation at highest speed means higher noise emission and higher instantaneous electric power consumption.

Therefore, there is a need for optimizing operation of the air compressor to operate in accordance with vehicle's air needs.

SUMMARY

According to a first aspect of the disclosure, a method for controlling airflow of an electric air compression system of an electric or hybrid vehicle is disclosed. The vehicle comprises one or more air consumers connected to an air storage system. The method comprises continuously monitoring air consumption data. The air consumption data are defined by an activation status of at least one of the one or more air consumers and/or air pressure gradient in the air storage system. The method further comprises determining an air consumption based on the monitored air consumption data and comparing the determined air consumption with a predetermined air consumption threshold. If the determined air consumption is below the predetermined air consumption threshold, the electric air compression system is controlled to operate at a first airflow value. If the determined air consumption is equal to or above the predetermined air consumption threshold, the electric air compression system is controlled to operate at a second airflow value. The second airflow value is greater than the first airflow value. The first aspect of the disclosure may seek to optimize operation of the electric air compression system to correspond to vehicle's air demands. In particular, the first aspect of the disclosure may seek to punctually increase the compressor airflow to answer to vehicle's high air demands.

The present disclosure is directed to any electric or hybrid vehicle, such as cars, or any heavy-duty vehicles, such as trucks, buses, etc. In general, compressed air needs on hybrid/electric vehicles are less important than on internal combustion engine (ICE) vehicles. Exhaust-after-treatment system which consumes air is no longer needed in hybrid/electric vehicles. Also, brakes in the electric/hybrid vehicles are consuming less air as there is a regenerative braking. As a consequence, there is not much optimization of the compression system in currently known electric/hybrid vehicles. Therefore, the electric air compression systems known in the art are less efficient in terms of airflow than reciprocating (pistons) air compressors used in ICE vehicles. However, efficiency is an important feature for each and every element of an electric/hybrid vehicle. The present disclosure therefore seeks to improve efficiency of the electric air compression system.

The airflow of an electric air compression system may be interpreted as amount of air generated by the air compressor at a certain pressure level. It can be expressed as an air delivery by the air compressor measured in liter per minute. According to the present disclosure, the airflow of the electric air compression system can be controlled to meet air demands of the air consumers connected to the electric air compression system.

Electric air compression system may form part of an air management system of the electric/hybrid vehicle. The electric air compression system may be used to provide compressed air to pneumatic systems of the vehicle. The electric air compression system may comprise an air compressor, an electric motor, and an electronic control unit. The air compressor itself is often referred to as an air end. The electronic control unit may control the electric motor which in turn drives the operation of the air compressor.

The vehicle comprises one or more air consumers connected to an air storage system. The air consumers may include a service brake, a park brake, air suspensions, trailer, various pneumatic auxiliaries, etc. The air storage system may comprise several air tanks typically interconnected with among each other. Each air consumer may be connected to at least one air tank. The air tanks comprise compressed air.

The method comprises continuously monitoring air consumption data. In the present context, continuous monitoring may imply that the air consumption data are retrieved every 5 minutes, or every minute, or every 30 seconds, or every second. A controller area network (CAN) may have air consumption information available at any time. The method may comprise a step of obtaining air consumption data from the CAN. The CAN may be connected to the air consumers and/or the air storage system to thereby retrieve activation statuses from the air consumers and air pressure in the air storage system. An electronic control unit (ECU) may be connected to the CAN to thereby retrieve available activation statuses and air pressure. The ECU may, from air pressures retrieved over time, obtain the pressure gradient in the air storage system. The ECU may control how often the air consumption information are retrieved from the CAN, to thereby generate the air consumption data and monitor it continuously.

The air consumption data are defined by an activation status of at least one of the one or more air consumers and/or air pressure gradient in the air storage system. In some examples, the air consumption data include only activation statuses of the air consumers. In some examples, the air consumption data include only air pressure gradient in the air storage system. In some examples, the air consumption data include both the activation statuses and the air pressure gradient.

Each of the air consumers may be active (switched on), or inactive (switched off). The activation status of air consumers may be available through the controller area network.

The air pressure gradient reflects changes in air pressure in the air storage system. In some cases, an activation status may not be available through the CAN, and thereby the air consumption may be defined by the air pressure gradient. For example, due to non-homogeneous transportation trailer fleet, there are some trailers without possibility to detect the pneumatic connection between trailer and tractor. Therefore, the activation status of the trailer may not be available to the CAN and its connection (activation) may be identified by measuring air pressure gradient. Typically, the trailer connection is very air consuming, especially when being connected.

The method further comprises determining an air consumption based on the monitored air consumption data and comparing the determined air consumption with a predetermined air consumption threshold. The air consumption reflects how many, if any, air consumers are active. Air consumption may change as soon as one of the air consumers changes its activation status. If the air consumer becomes active, the air consumption in vehicle will increase. An increase in air consumption is followed by changes in pressure in the air storage system. It is possible to determine actual value of air consumption, $C_a$ [L/min] based on the air pressure gradient (dP/dt) and vehicle air storage system volume $V_a$:

$$C_a = V_a * dP/dt.$$

Each air consumer may be associated with an actual air consumption value. Alternatively, each air consumer may be associated with a consumer type, e.g., "a consumer with high air needs" and "a consumer with low air needs". If "a consumer with low air needs" is detected as active, the electric air compression system may be operated at the first air flow value. If "a consumer with high air needs" is detected as active the air compression system may be operated at the second air flow value. In case when more than one air consumer is active, the electrical air compression system may be operated at the second air flow value if the sum of all active consumers with low air needs is associated to "high air needs".

The predetermined air consumption threshold may be a value set by the ECU based on an average air consumption in the vehicle. The ECU may change the threshold on daily basis and based on the average air consumption in the vehicle in previous time periods. Alternatively, the predetermined air consumption threshold may be a fixed pre-programmed value. Typically, the predetermined air consumption threshold may be higher than the average air consumption in the vehicle.

If the determined air consumption is below the predetermined air consumption threshold, the airflow of the electric air compression system is controlled to operate at a first airflow value. The first airflow value may correspond to a nominal airflow value.

If the determined air consumption is equal to or above the predetermined air consumption threshold, the airflow of the electric air compression system is controlled to operate at a second airflow value.

Typically, the air compression system will operate at the second airflow value when a big air consumer (e.g., the air suspension) is activated. The CAN may detect activation of the big air consumer. The CAN may obtain information about air pressure consumption which is defined by all active air consumers of the vehicle.

The second airflow value is greater than the first airflow value. The second airflow value may be at least 50% higher than the first airflow value.

A technical benefit of operating the air compression system at the second airflow value upon detection of higher air demands may include an improved operation of all air consumers. In particular, operation of large air consumers will be improved and additional time needed to inflate the air consumer is not needed. Furthermore, by controlling the electrical air compression system in accordance with air demands in the air management system, energy consumption in the vehicle is optimized.

In some examples, the electric air compression system comprises an electric motor. Controlling the airflow of the electric air compression system may be achieved by controlling the speed of the electric motor. The electric motor may be controlled by the ECU. Having an electric motor as a part of the electric air compression system results in an independent system, i.e., a system which does not depend on other vehicle's system which may be controlled by other control units. Rotational speed (RPM) of the air compressor may be controlled by the ECU. As the compressor airflow is typically proportional to the rotational speed of the air compressor (not necessarily linearly), and the rotational speed of the air compressor is defined by the rotational speed of the electric motor, the airflow of the electric air compression system may be directly controlled by controlling the speed of the electric motor.

The first airflow value may correspond to air compressor operation at a nominal speed. When the air compressor is at the nominal speed, it answers to average air consumption of the vehicle. The average vehicle air consumption may be 50-150 stdL/min. When the air compressor operates at the nominal speed it answers to the average vehicle air consumption while limiting power consumption and noise. In other words, the nominal speed is a speed that is high enough to deliver enough airflow to the air consumers while it is also low enough to limit electrical power and noise emission. The second airflow value may correspond to air compressor operation at a second speed, the second speed being higher than the nominal speed. Therefore, the electric air compression system may be controlled to temporarily change operation speed of the compressor to thereby meet air consumption demands in the air management system.

In some examples, the predetermined air consumption threshold is defined as a predetermined pressure gradient threshold in the air storage system. If the monitored air consumption data are related to a pressure gradient in the air storage system, the ECU may use the predetermined air consumption threshold defined as a predetermined pressure gradient threshold to thereby compare it with the obtained actual pressure gradient in the air storage system. The predetermined pressure gradient threshold is typically negative, as it should reflect a threshold for a tolerable pressure drop in the air storage system. In this case, if the absolute value of the determined pressure gradient is below the absolute value of the predetermined pressure gradient threshold, the electric air compression system is controlled to operate at a first airflow value. If the absolute value of the determined pressure gradient is equal to or above the absolute value of the predetermined pressure gradient threshold, the electric air compression system is controlled to operate at a second airflow value.

In some examples, the predetermined air consumption threshold is defined as a total air consumption threshold. In some examples, the ECU can estimate a total air consumption of all active air consumers from the obtained air consumption data. In this case, the total estimated air consumption will be compared with a threshold defined by the total air consumption threshold.

In some examples, the predetermined air consumption threshold can be defined as a combination of a predetermined pressure gradient threshold and a total air consumption threshold. By having the predetermined air consumption threshold defined as a predetermined pressure gradient threshold and/or a predetermined total air consumption threshold it is possible to quickly compare the obtained air consumption data with these threshold values to thereby appropriately control the airflow in the electric air compression system, i.e., no additional computational time/power is needed for the ECU to perform the comparison.

In some examples, the determined air consumption is defined by a sum of the air consumption of all active air consumers. Active air consumers are those air consumers having an active activation status, i.e., enabled (switched on) air consumers. The active air consumers will contribute to the sum as having air consumption above zero. Inactive air consumers are those air consumers having an inactive activation status i.e., disabled (switched off) air consumers. The inactive air consumers typically do not contribute to the sum as their air consumption is zero or close to zero. The ECU may receive activation status for each air consumer in the vehicle. The ECU may comprise a table with air consumption values for each air consumer, as each air consumer is associated with its own predefined air consumption value. Based on the values in the list and the received activation statuses, the ECU can determine the air consumption sum for all the active consumers and compare it with the threshold. The determined air consumption may be a sum of the air consumption of all active air consumers. Controlling the airflow of the electric air compression system to operate at the second airflow value is performed if the sum of the air consumption of all active air consumers is equal to or above the predetermined air consumption threshold.

In some examples, the ECU may comprise a classification list, classifying the air consumers as high air consumers and low air consumers. If at least one high air consumer is active, the electric air compression system may be controlled to operate at the second airflow value. In this manner, calculation time/power is reduced, as there is no need to consider air consumption of other active air consumers, nor any pressure changes in the system.

In some examples, the determined air consumption is defined by a pressure gradient in the air storage system. The pressure gradient may be considered if the activation status of the air consumers is not available. The pressure gradient may be obtained from at least two successive air pressure values in the air storage system. The pressure gradient describes in which direction and at what rate the pressure changes in the system. The pressure gradient is negative if there is a pressure drop in the air storage system. The pressure typically drops when an air consumer changes its status from inactive to active. The pressure gradient is positive if there is a pressure increase in the air storage system. The pressure in the air storage system typically remains the same when an air consumer changes its activation status from active to inactive, unless there is some air production, i.e., the air compressor is active. Controlling the airflow of the electric air compression system to operate at a second airflow value is performed if the actual value of the pressure gradient in the air storage system is below the predetermined air consumption threshold, and/or below the negative predetermined pressure gradient threshold.

In some examples, the first airflow value is selected to meet an average airflow demand of the vehicle. The first airflow value is thereby high enough to deliver enough airflow and at the same time low enough to limit electrical power and noise emission of the electric air compression system. The average airflow demand of an electrical vehicle depends on the type of the vehicle. For trucks, the average airflow demand may be between 50 and 150 L/min, such as 100 L/min. The second airflow value may be selected to be at least 50% higher than the first airflow value. In some examples, the second airflow value may be selected to be the maximum airflow value achievable by the air compressor. In yet one alternative, the second airflow value may be selected to meet airflow demands of the most demanding air consumer in the vehicle, i.e., the air consumer requiring the highest airflow. In some examples, a test measurement is performed in order to determine an average airflow demand, as well as a maximum airflow demand in the vehicle.

The electric air compression system typically operates between two air pressure setpoints. A cut-off pressure is one of the air compressor setpoints. The cut-off pressure is typically the air pressure at which the air compressor stops. Until the air pressure in the air storage system is below the cut-off value, the air compressor will operate, and when the air pressure becomes equal or higher than the cut-off value, the air compressor will be turned off. The cut-off pressure is sometimes referred as a cut-out pressure. Another setpoint is a cut-in pressure value. The cut-in pressure value is typically lower than the cut-off pressure. The cut-in pressure is typically the air pressure at which the air compressor starts. The pressure differential between the cut-in and cut-off may at least be 1 bar.

In some examples, the method further comprises determining when the air pressure in the air storage system reaches a cut-off pressure value and turning off the electric air compression system when the air pressure in the air storage system reaches the cut-off pressure value. The method therefore comprises a step of monitoring the air pressure in the air storage system. The air storage system may be equipped with pressure sensors which may communicate the obtained pressure values to the CAN. The measured pressure is then compared with the cut-off pressure to determine how to control the air compression system. Typically, the determination of whether the air pressure in the storage system reached the cut-off pressure value is performed after the comparison of the air consumption and the predetermined air consumption threshold is performed.

In some examples, the method further comprises comparing the air pressure in the air storage system with the cut-in pressure value and controlling the airflow of the electric air compression system to operate at the first airflow value as soon as the air pressure in the air storage system is lower than the cut-in pressure value. When the compression system is switched off, and at least one of the consumers is activated, air from the air storage system will be consumed what will lead to pressure drop. Typically, activation of the consumer will cause air pressure drop. If the air pressure drop does not exceed the predetermined gradient threshold (i.e., normal air consumption, second air flow not needed), the system waits for the pressure to decrease below cut-in to start the compressor at the first/nominal airflow value. If the air pressure drop exceeds the predetermined gradient threshold (i.e., high air consumption, the second airflow value needed), the system does not wait for the pressure to decrease below cut-in and starts the compressor at the second air flow value. This allows to save time and directly deliver second air flow from the compressor. If the compressor is already running at the first airflow value and high air consumption is detected, the compressor is then switched to the operate at the second airflow value.

In some examples, the second airflow value is in the range of 135%-185% of the first airflow value.

According to a second aspect of the disclosure an electric air compression system for an electric or hybrid vehicle is disclosed. The electric air compression system comprises an air compressor and a control unit. The electric air compression system is configured to provide compressed air to one or more air consumers through an air storage system. The control unit is configured to continuously monitor air consumption data. The air consumption data are defined by an activation status of each of the one or more air consumers and/or air pressure gradient in the air storage system. The control unit is further configured to determine an air consumption based on the monitored air consumption data and compare the determined air consumption with a predetermined air consumption threshold. If the determined air consumption is below the predetermined air consumption threshold, the control unit controls the air compressor to operate at a first airflow value. If the determined air consumption is equal to or above the predetermined air consumption threshold, the control unit controls the air compressor to operate at a second airflow value. The second airflow value is greater than the first airflow value.

The control unit may form part of the ECU. The control unit may obtain the activation statuses of the air consumers directly from, e.g., CAN. The control unit may continuously obtain values of the air pressure in the air storage system. The air storage system may comprise a pressure sensor configured to measure the air pressure therein and communicate it to the control unit. The control unit may, based on at least two successive air pressure values determine the pressure gradient in the air storage system.

The second aspect of the disclosure may seek to optimize compressed air production of the vehicle such that the compressed air production corresponds to vehicle's air demands. In particular, the second aspect of the disclosure may seek to punctually increase the compressor airflow to answer to vehicle's high air demands. A technical benefit may include improved power consumption in the vehicle.

In some examples, the electric air compression system further comprises an electric motor configured to control the airflow of the air compressor. The control unit may be configured to control the speed of the electric motor to thereby control the airflow in the electric air compression system.

In some examples, the electric air compression system is configured to obtain air consumption data from a vehicle communication network. The communication network may be implemented as CAN, Ethernet, or similar. Each of the air consumers in the vehicle may have a CAN controller chip. It is beneficial to use a communication network such as CAN, as it connects multiple devices and ensures communication with one another. Such network decreases overall cost and weight in the vehicle.

According to a third aspect of the disclosure, an electric or hybrid vehicle comprising the electric air compression system according to the second aspect is disclosed. A technical benefit of the third aspect may be an improved electric/hybrid vehicle in terms of power consumption and in terms of computational power.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

The present disclosure is directed to any electric or hybrid vehicle, such as cars, or any heavy-duty vehicles, such as trucks, buses, etc. In general, compressed air needs on hybrid/electric vehicles are less important than on internal combustion engine (ICE) vehicles. Exhaust-after-treatment system which consumes air is no longer needed in hybrid/electric vehicles. Also, brakes in the electric/hybrid vehicles are consuming less air as there is a regenerative braking. As a consequence, there is not much optimization of the compression system in currently known electric/hybrid vehicles. Therefore, the electric air compression systems known in the art are less efficient in terms of airflow than reciprocating (pistons) air compressors used in ICE vehicles. However, efficiency is an important feature for each and every element of an electric/hybrid vehicle. The present disclosure therefore seeks to improve efficiency of the electric air compression system.

The first aspect of the disclosure may seek to optimize operation of the electric air compression system to correspond to vehicle's air demands. In particular, the first aspect of the disclosure may seek to punctually increase the compressor airflow to answer to vehicle's high air demands.

Figure 1:
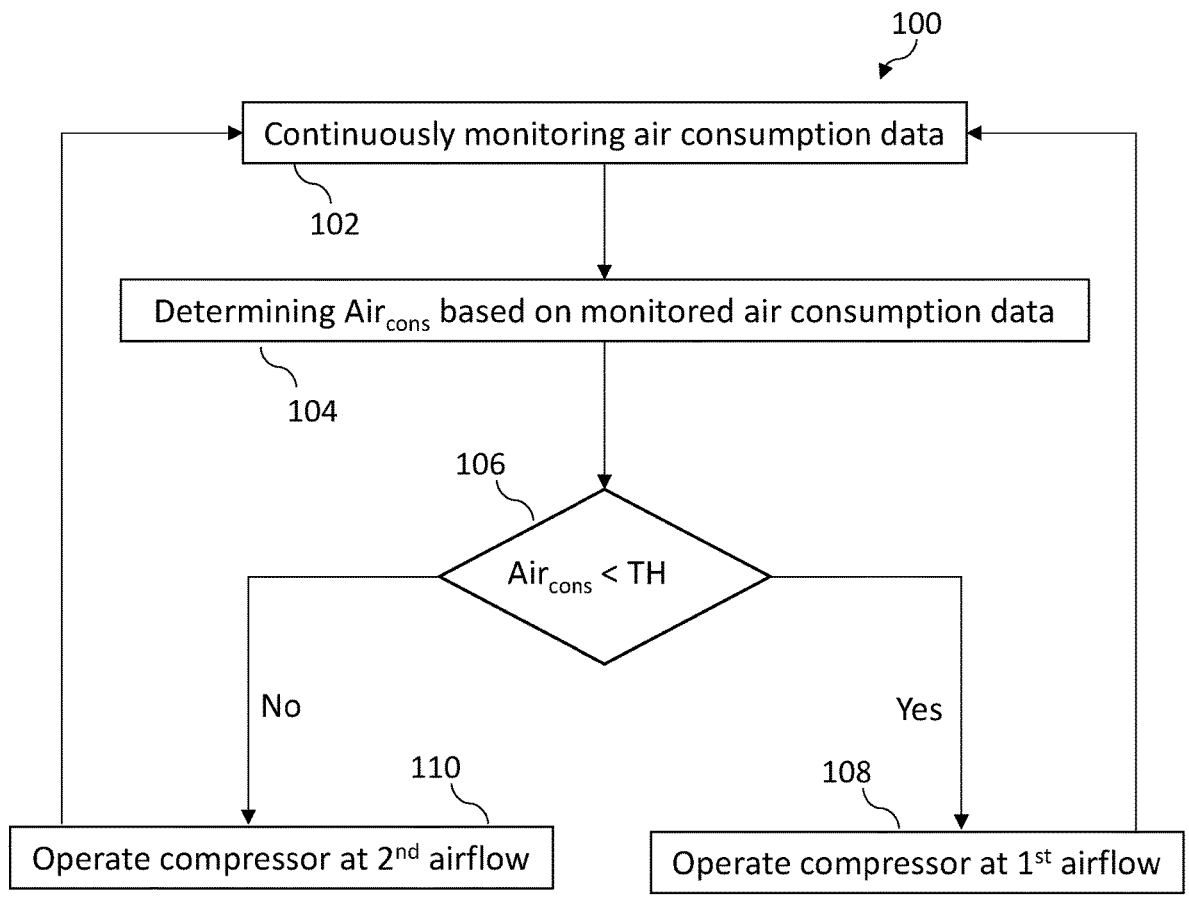
FIG. 1 is an exemplary method for controlling airflow of an electric air compression system of an electric or hybrid vehicle according to one example.

FIG. 1 is an exemplary method 100 for controlling airflow of an electric air compression system of an electric or hybrid vehicle according to one example. The vehicle comprises one or more air consumers connected to an air storage system. The method 100 comprises step 102 of continuously monitoring air consumption data. The air consumption data are defined by an activation status of at least one of the one or more air consumers and/or air pressure gradient in the air storage system. The method further comprises step 104 of determining an air consumption based on the monitored air consumption data and step 106 of comparing the determined air consumption with a predetermined air consumption threshold. If the determined air consumption is below the predetermined air consumption threshold, the electric air compression system is controlled to operate at a first airflow value, step 108. If the determined air consumption is equal to or above the predetermined air consumption threshold, the electric air compression system is controlled to operate at a second airflow value, step 110. The second airflow value is greater than the first airflow value.

Once the compressor is adjusted to operate at an appropriate airflow value, the controlling process is continued by continued monitoring of the air consumption data and performing the same steps as described above. This closed control circuit is indicated by arrows connecting steps 108 and 110 with step 102.

Figure 2:
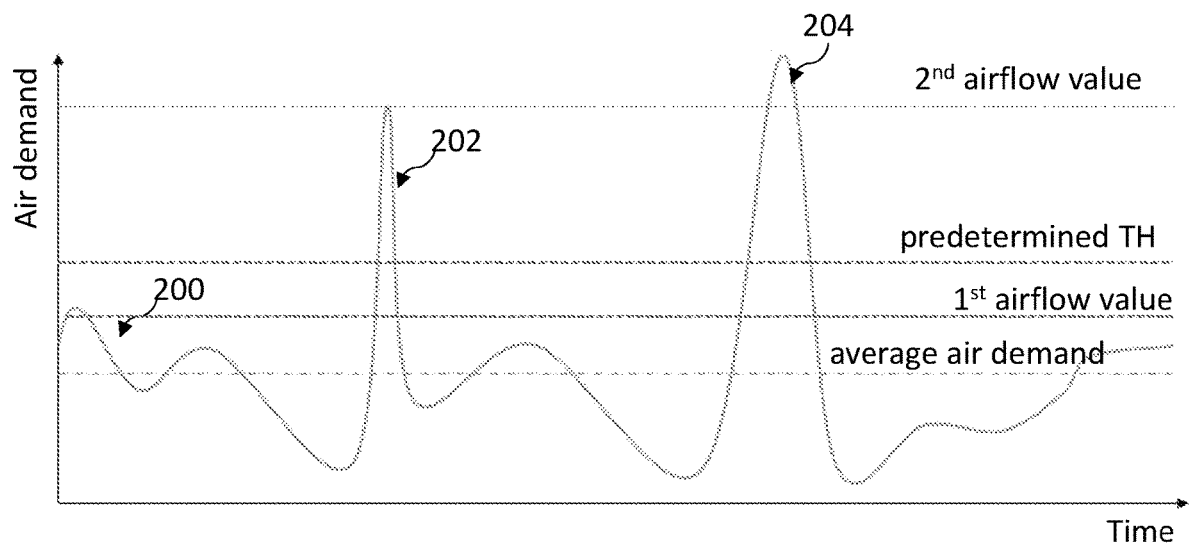
FIG. 2 is an exemplary graph of air demand in the electric or hybrid vehicle over time.

FIG. 2 is an exemplary graph 200 of air demand in the electric or hybrid vehicle over time. The graph 200 shows how air demand changes during operation of the vehicle. The peaks 202 and 204 represent activation of high consumers, e.g., an emergency brake, and a suspension system. The air demand may directly translate into air consumption, and changes in the air demand may directly translate into a pressure gradient. When the emergency brake is activated, air demand rises, peak 202, until the brake is released. According to the method of the present disclosure, the electric air compression system will be operated at the first airflow value as long as there are no large changes in air demand. Steep increase in the air demand results in a significant pressure drop in the air storage system, and as soon as the pressure drop exceeds the predetermined threshold, the system will be controlled to operate at the second air flow. The system will be operated at the second airflow until the brake is deactivated, and/or until the pressure drop in the air storage system be smaller than the threshold. The same scenario will occur upon activation of the other consumer, causing the second peak 204 in air consumption. The graph also shows that the first airflow value is typically higher than average air demand.

Figure 3:
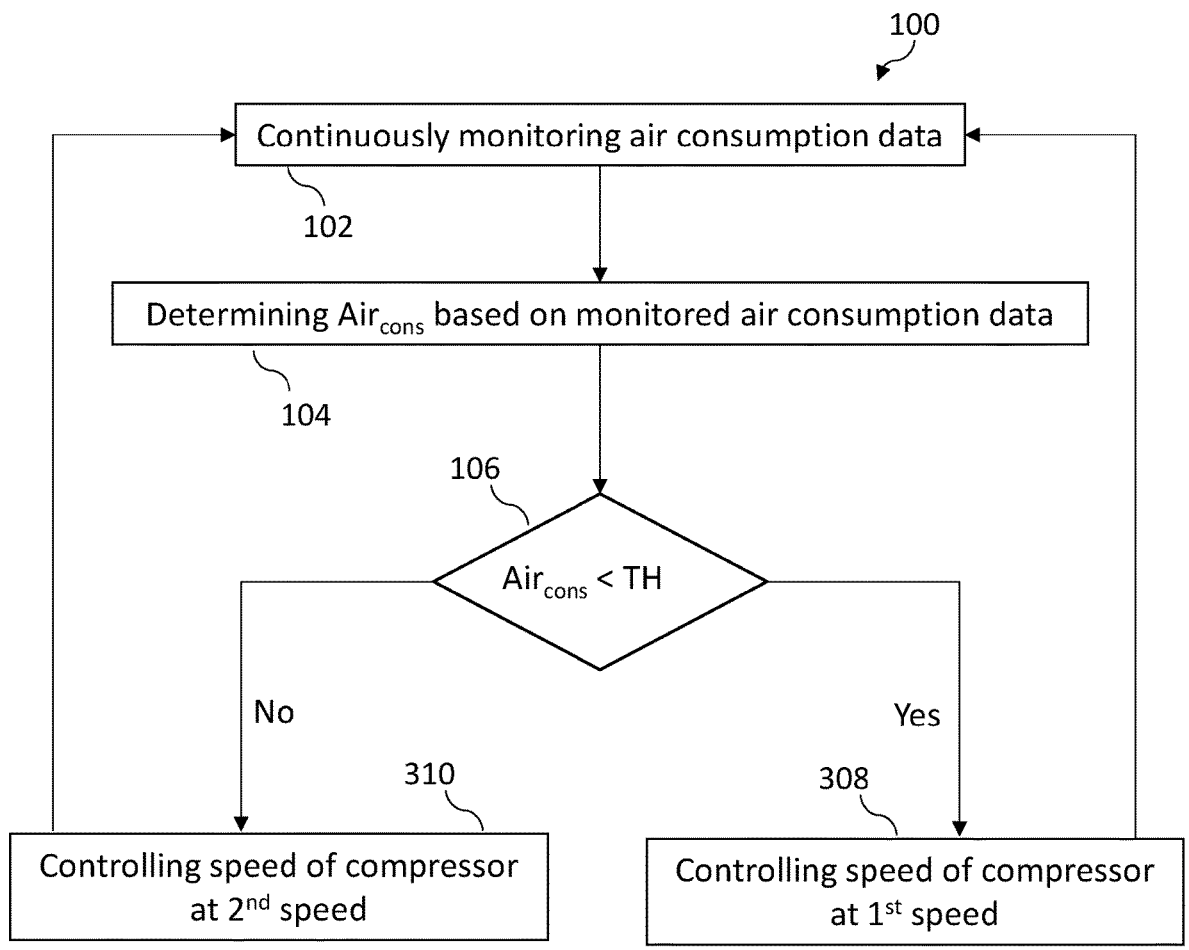
FIG. 3 is an exemplary method for controlling airflow of an electric air compression system of an electric or hybrid vehicle according to another example.

FIG. 3 is an exemplary method for controlling airflow of an electric air compression system of an electric or hybrid vehicle according to another example. In some examples, the electric air compression system comprises an electric motor. The method 100 may therefore comprises controlling the airflow of the electric air compression system is by controlling the speed of the electric motor. If the determined air consumption is below the predetermined air consumption threshold, the electric air compression system may be controlled to operate at a first speed, step 308. If the determined air consumption is equal to or above the predetermined air consumption threshold, the electric air compression system may be controlled to operate at a second speed, step 310. The second speed is greater than the first speed. The airflow delivered by the air compression system may be defined by the speed of the electric motor. The higher the speed of the motor the higher the airflow is.

Figure 4:
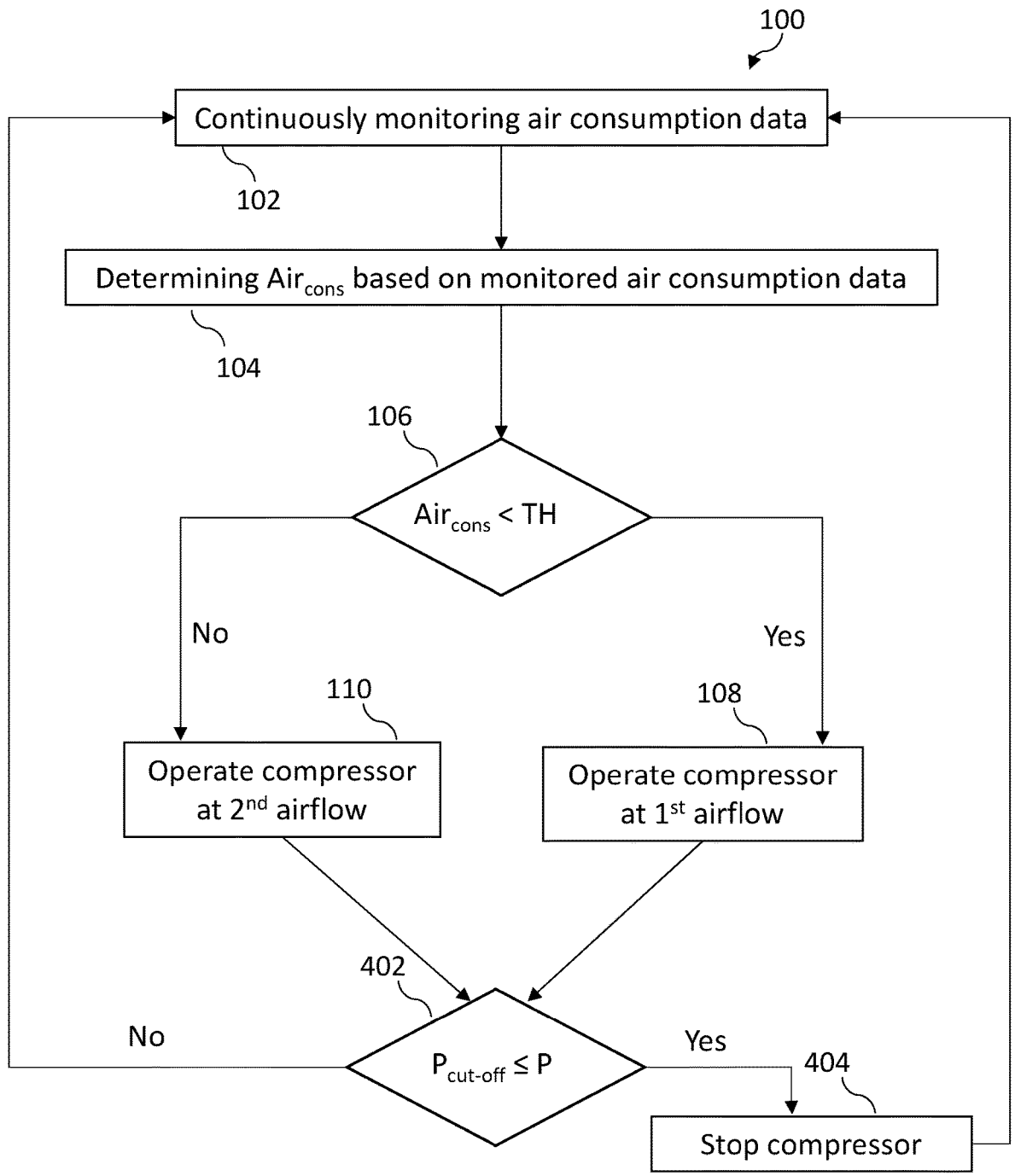
FIG. 4 is an exemplary method for controlling airflow of an electric air compression system of an electric or hybrid vehicle according to yet another example.

FIG. 4 is an exemplary method for controlling airflow of an electric air compression system of an electric or hybrid vehicle according to yet another example. In this example, all the features of FIG. 1 are present and additionally, the method 100 further comprises determining when the air pressure P in the air storage system reaches a cut-off pressure value $P_{cut-off}$, step 402. If the air pressure P exceeds the cut-off pressure $P_{cut-off}$ the compressor is turned off, step 404. Even after the compressor is stopped, air consumption is continued to be monitored. If the air pressure is below the cut-off pressure, the compressor may continue operating at either the first or the second airflow value.

Figure 5:
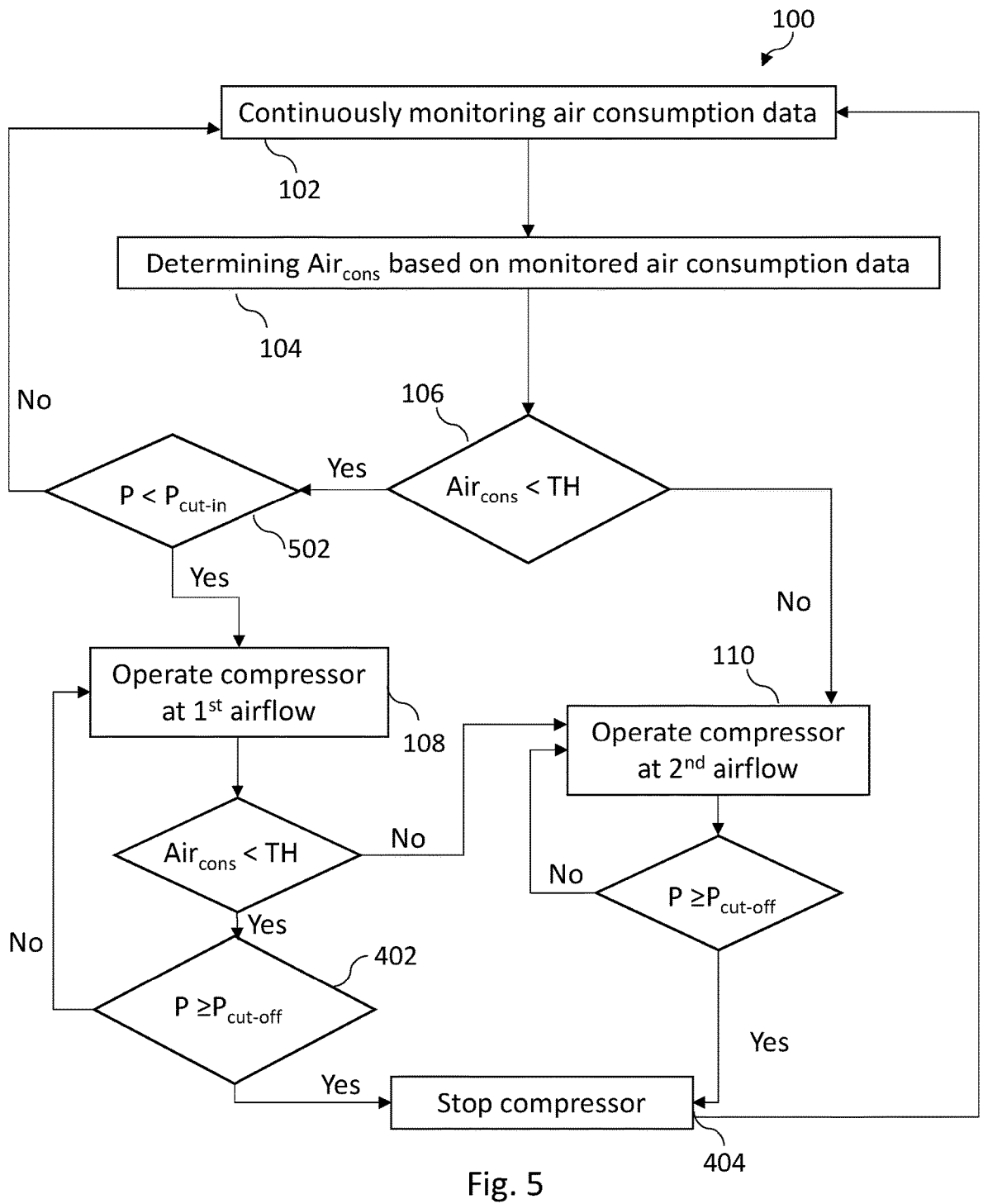
FIG. 5 is an exemplary method for controlling airflow of an electric air compression system of an electric or hybrid vehicle according to yet another example.

FIG. 5 is an exemplary method for controlling airflow of an electric air compression system of an electric or hybrid vehicle according to yet another example. In this example, all the features of FIG. 4 are present and additionally, the method further comprises comparing the air pressure P in the air storage system with a cut-in pressure value $P_{cut-in}$, step 502. This comparison is performed in cases when the determined air consumption is below the predetermined threshold. If the air pressure P is lower or equal to the cut-in pressure $P_{cut-in}$, the compressor is operated at the first airflow value, step 108 until the air pressure in the air storage system is lower than the cut-in pressure value. If the air pressure P is above the cut-in pressure $P_{cut-in}$, determination of the air consumption data will be performed.

Figure 6:
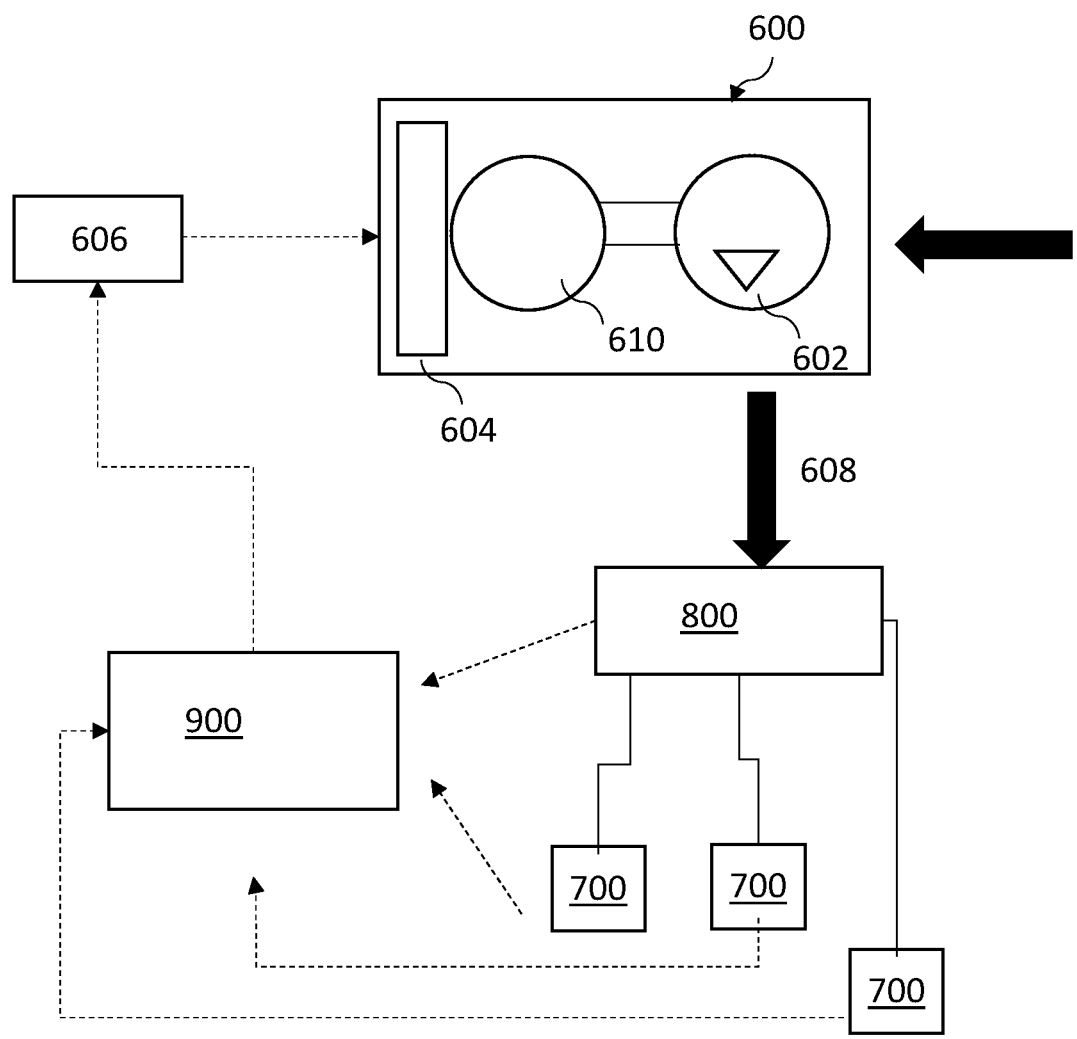
FIG. 6 is an exemplary electric air compression system of an electric or hybrid vehicle according to one example.

FIG. 6 is an exemplary electric air compression system 600 of an electric or hybrid vehicle according to one example. The electric air compression system 600 may seek to optimize air production of the vehicle such that the air production corresponds to vehicle's air demands. In particular, the second aspect of the disclosure may seek to punctually increase the compressor airflow to answer to vehicle's high air demands. A technical benefit may include improved power consumption in the vehicle.

The electric air compression system 600 comprises an air compressor 602 and a control unit 604. The electric air compression system 600 is configured to provide compressed air 608 to one or more air consumers 700 through an air storage system 800. The control unit 604 is configured to continuously monitor air consumption data. The air consumption data are defined by an activation status of each of the one or more air consumers and/or air pressure gradient in the air storage system. The control unit 604 is further configured to determine an air consumption based on the monitored air consumption data and compare the determined air consumption with a predetermined air consumption threshold. If the determined air consumption is below the predetermined air consumption threshold, the control unit 604 controls the air compressor to operate at a first airflow value. If the determined air consumption is above the predetermined air consumption threshold, the control unit 604 controls the air compressor to operate at a second airflow value. The second airflow value is greater than the first airflow value.

The control unit 604 may form part of the ECU 606. The control unit 604 may obtain the activation statuses of the air consumers directly from, e.g., CAN 900. The control unit may continuously obtain values of the air pressure in the air storage system 800. The air storage system 800 may comprise a pressure sensor (not shown) configured to measure the air pressure therein and communicate it to the control unit 604. The control unit may, based on at least two successive air pressure values determine the pressure gradient in the air storage system. Both the control unit 604 and ECU 606 may decide how to control the air compressor 602 (e.g., which compressor speed to run at) based on the storage pressure info from the air storage system 800 and activation statuses from the air consumers 700 received through CAN 900.

The electric air compression system may further comprise an electric motor 610 configured to control the airflow of the air compressor 602. The control unit 604 may be configured to control the speed of the electric motor to thereby control the airflow in the electric air compression system. The electric air compression system 600 may be configured to obtain air consumption data from a vehicle communication network 900. The communication network may be implemented as CAN 900, Ethernet, or similar. Each of the air consumers in the vehicle may have a CAN controller chip. It is beneficial to use a communication network such as CAN, as it connects multiple devices and ensures communication with one another. Such network decreases overall cost and weight in the vehicle.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the schematic drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A method for controlling airflow of an electric air compression system of an electric or hybrid vehicle, the vehicle comprising one or more air consumers connected to an air storage system, the method comprising:
   continuously monitoring air consumption data, the air consumption data being defined by an activation status of at least the one or more air consumers;
   determining an air consumption based on the monitored air consumption data;
   comparing the determined air consumption with a predetermined air consumption threshold; and
   if the determined air consumption is below the predetermined air consumption threshold
      controlling the electric air compression system to operate at a first airflow value;
   if the determined air consumption is equal to or above the predetermined air consumption threshold
      controlling the electric air compression system to operate at a second airflow value, the second airflow value being greater than the first airflow value.

2. The method of claim 1, wherein the electric air compression system comprises an electric motor and wherein controlling the airflow of the electric air compression system is achieved by controlling the speed of the electric motor.

3. The method of claim 1, wherein the predetermined air consumption threshold is defined as a predetermined pressure gradient threshold in the air storage system and/or as a predetermined total air consumption threshold.

4. The method of claim 1, wherein the determined air consumption is defined by a sum of the air consumption of all active air consumers.

5. The method of claim 1, wherein the determined air consumption is defined by a pressure gradient in the air storage system.

6. The method of claim 1, wherein the first airflow value is selected to meet an average airflow demand of the vehicle and wherein the second airflow value is selected to be at least 50% higher than the first airflow value.

7. The method of claim 1, wherein the method further comprises determining when the air pressure in the air storage system reaches a cut-off pressure value and turning off the electric air compression system when the air pressure in the air storage system reaches the cut-off pressure value.

8. The method of claim 1, wherein the method further comprises comparing the air pressure in the air storage system with a cut-in pressure value and controlling the airflow of the electric air compression system to operate at the first airflow value as soon as the air pressure in the air storage system is lower than the cut-in pressure value.

9. The method of claim 1, wherein the second airflow value is in the range of 135%-185% of the first airflow value.

10. An electric air compression system for an electric or hybrid vehicle,
    the electric air compression system comprises an air compressor and a control unit and being configured to provide compressed air to one or more air consumers through an air storage system, the control unit being configured to:
       continuously monitor air consumption data, the air consumption data being defined by an activation status of at least the one or more air consumers;
       determine an air consumption based on the monitored air consumption data;

compare the determined air consumption with a predetermined air consumption threshold; and if the determined air consumption is below the predetermined air consumption threshold
control the air compressor to operate at a first airflow value;

if the determined air consumption is equal to or above the predetermined air consumption threshold
control the air compressor to operate at a second airflow value, the second airflow value being greater than the first airflow value.

11. The electric air compression system according to claim 10, wherein the system further comprises an electric motor configured to control the airflow of the air compressor, and wherein the control unit is configured to control the speed of the electric motor to thereby control the airflow in the electric air compression system.

12. The electric air compression system according to claim 10, wherein the system is configured to obtain air consumption data from a vehicle communication network.

13. An electric or hybrid vehicle comprising the electric air compression system according to claim 10.

* * * * *